(12) United States Patent  
Miyasaka

(10) Patent No.: US 7,730,787 B2  
(45) Date of Patent: Jun. 8, 2010

(54) BOURDON TUBE PRESSURE GAUGE

(75) Inventor: Teruaki Miyasaka, Nagano (JP)

(73) Assignee: Fuji Burudon Mfg. Co., Ltd. (JP)

( * ) Notice: Subject to any disclaimer, the term of this patent is extended or adjusted under 35 U.S.C. 154(b) by 54 days.

(21) Appl. No.: 12/276,611

(22) Filed: Nov. 24, 2008

(65) Prior Publication Data

US 2010/0064817 A1    Mar. 18, 2010

(30) Foreign Application Priority Data

Sep. 17, 2008    (JP) ................. 2008-238345

(51) Int. Cl.  
*G01L 7/04*    (2006.01)
(52) U.S. Cl. .......................... 73/732; 73/741
(58) Field of Classification Search ........... None  
See application file for complete search history.

(56) References Cited

U.S. PATENT DOCUMENTS 3,407,665 A  * 10/1968 Noakes et al. ............... 73/742

4,773,271 A  * 9/1988 Mutou et al. ................ 73/741  
7,181,976 B2 * 2/2007 Radau ........................ 73/732  
7,546,773 B2 * 6/2009 Wu ............................ 73/732  
2006/0191348 A1 * 8/2006 Radau ........................ 73/732

FOREIGN PATENT DOCUMENTS

JP    58198737 A  * 11/1983  
JP    2008-196893    8/2008

* cited by examiner

*Primary Examiner*—Andre J Allen  
(74) *Attorney, Agent, or Firm*—Harness, Dickey & Pierce, P.L.C.

(57) ABSTRACT

The bourdon tube pressure gauge includes: a joint which is made of the resin and is attached to a pressure container; and a bourdon tube which is made of metal and has a rear end fixed to the joint. The joint comprises a fixation hole into which the rear end of the bourdon tube is inserted to be fixed by bonding, and an inside of the fixation hole is more widened than an opening of the fixation hole which serves as an insertion port for the bourdon tube.

8 Claims, 5 Drawing Sheets

BOURDON TUBE PRESSURE GAUGE

CROSS-REFERENCE TO RELATED APPLICATION

This application claims priority to Japanese Application No. 2008-238345 filed Sep. 17, 2008, the entire disclosures of which is hereby incorporated by reference.

BACKGROUND OF THE INVENTION

1. Field of the Invention

The present invention relates to a bourdon tube pressure gauge.

2. Description of the Related Art

As a pressure gauge for measuring an internal pressure in a pressure container and the like, there is conventionally known a bourdon tube pressure gauge employing a bourdon tube (refer to Japanese Patent Publication No. 2008-196893A, for example). A bourdon tube pressure gauge described in the Japanese Patent Publication (JP2008-196893A) includes a bourdon tube and a joint to which a rear end of the bourdon tube is fixed. In this bourdon tube pressure gauge, the bourdon tube and the joint are made of metallic materials such as a copper metal and steel. In addition, in the bourdon tube pressure gauge, in order to fix a rear end of the bourdon tube to the joint, the rear end of the bourdon tube is inserted into and brazed to a fitting hole which is formed in the joint In recent years, needs for reduction in cost of the bourdon tube pressure gauge are increasing in the market. If a resin is used as a material of the joint in response to this, cost of the bourdon tube pressure gauge can be reduced. However, it is impossible to fix by brazing a bourdon tube made of metal to a joint made of a resin, and hence there is a fear of degrading a fixation strength of the bourdon tube with respect to the joint. Accordingly, there is a fear in that generation of pressure inside the bourdon tube results in detachment of the rear end of the bourdon tube from the fitting hole of the joint.

SUMMARY OF THE INVENTION

Therefore, an object of the present invention is to provide a bourdon tube pressure gauge capable of preventing detachment from a joint of a bourdon tube which is made of metal and is fixed to the joint made of a resin.

In order to attain the above-mentioned object, the present invention provides a bourdon tube pressure gauge including: a joint which is made of a resin and is attached to a pressure container; and a bourdon tube which is made of metal and has a rear end fixed to the joint, in which the joint includes a fixation hole into which the rear end of the bourdon tube is inserted to be fixed by bonding, and in which an inside of the fixation hole is more widened than an opening of the fixation hole which serves as an insertion port for the bourdon tube.

In the bourdon tube pressure gauge of the present invention, the rear end of a bourdon tube made of metal is inserted into the fixation hole which is formed in a joint made of a resin, to be fixed by bonding. Further, the inside of the fixation hole is more widened than the opening of the fixation hole which serves as the insertion port for the bourdon tube. Thus, spaces formed between an inner wall surface of the fixation hole and the rear end of the bourdon tube can serve as a pool portion for an adhesive for performing fixation by bonding of the rear end of the bourdon tube to the fixation hole. Further, by forming the spaces formed between the inner wall surface of the fixation hole and the rear end of the bourdon tube as the pool portion for the adhesive (adhesive pool portion), even when a pressure is generated inside the bourdon tube to generate a load applied to the bourdon tube in a direction of detaching from the fixation hole, the adhesive cured in the adhesive pool portion is caught inside the fixation hole, to thereby become less likely to peel off from the inner wall surface of the fixation hole. Therefore, even when the load in the direction of detaching from the fixation hole is applied to the bourdon tube, the bourdon tube is less likely to be detached from the fixation hole as long as the adhesive does not peel off from the surface of the bourdon tube. That is, according to the present invention, it is possible to prevent the detachment of the bourdon tube made of metal from the joint made of a resin.

As described above, according to the bourdon tube pressure gauge of the present invention, it is possible to prevent the detachment from the joint of the bourdon tube which is made of metal and is fixed to the joint made of a resin.

BRIEF DESCRIPTION OF THE DRAWINGS

In the accompanying drawings:

FIGS. 3 are diagrams illustrating the joint of FIG. 1, of which

DETAILED DESCRIPTION OF THE PREFERRED EMBODIMENT

Hereinafter, an embodiment of the present invention is described with reference to the drawings.

Schematic Structure of a Bourdon Tube Pressure Gauge

Figure 1:
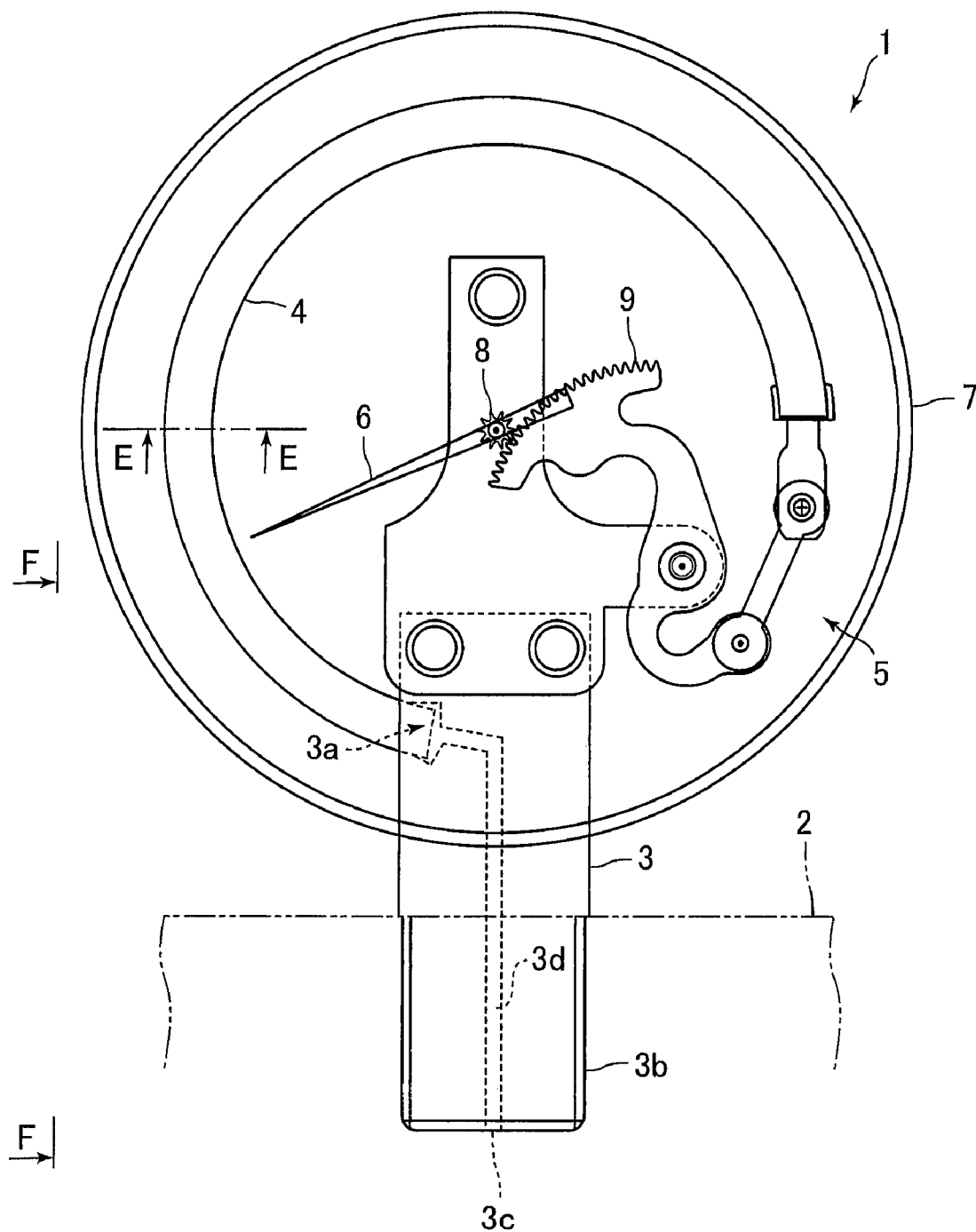
FIG. 1 is a front view illustrating a schematic structure of a bourdon tube pressure gauge according to an embodiment of the present invention.
Figure 2:
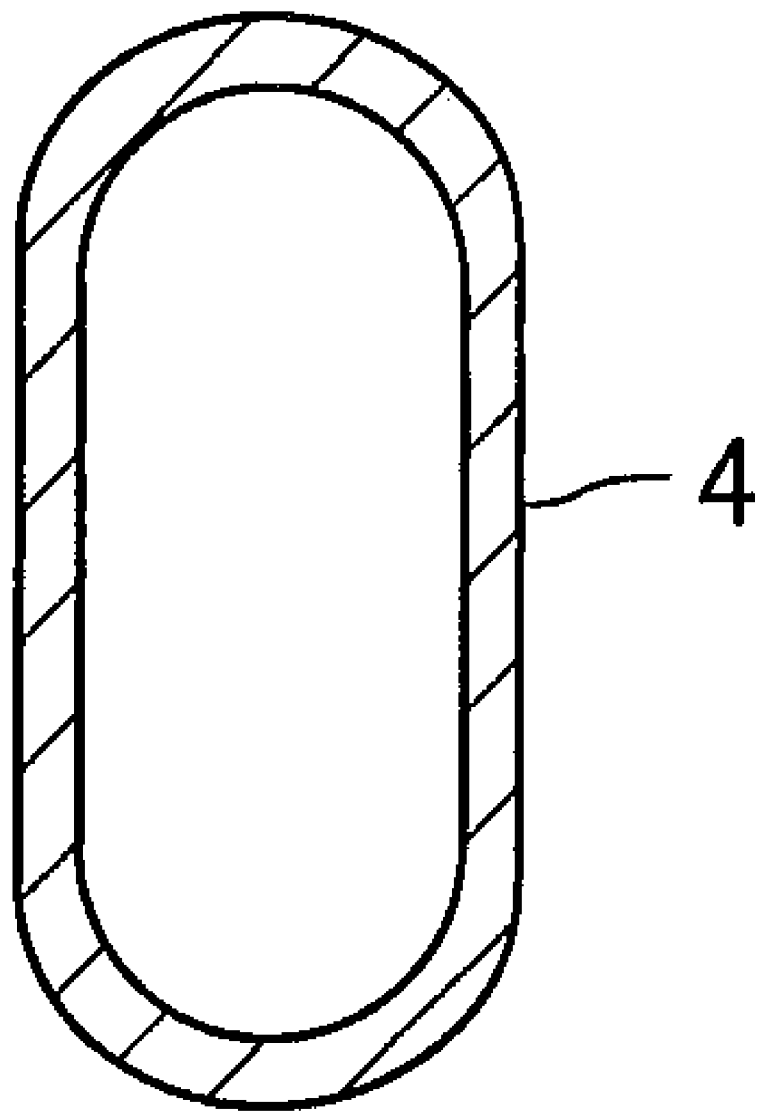
FIG. 2 is a sectional view taken along a line E-E of FIG. 1.

FIG. 1 is a front view illustrating a schematic structure of a bourdon tube pressure gauge 1 according to an embodiment of the present invention. FIG. 2 is a sectional view taken along the line E-E of FIG. 1.

The bourdon tube pressure gauge 1 according to this embodiment is an apparatus for measuring a pressure inside a pressure container 2 such as a compressor and a tank. As illustrated in FIG. 1, the bourdon tube pressure gauge 1 includes a joint 3 which is attached to the pressure container 2, and a bourdon tube 4 having a rear end which is fixed to the joint 3. A leading end of the bourdon tube 4 is connected to a pointer 6 though a displacement enlarging mechanism 5. Further, a part of the joint 3, the bourdon tube 4, the displacement enlarging mechanism 5, the pointer 6, and the like are arranged inside a case 7 which is formed into a bottomed cylindrical shape. Note that, in FIG. 1, the joint 3 is directly fixed to the pressure container 2, however, the joint 3 may be attached to the pressure container 2 though a predetermined pipe or the like.

The bourdon tube 4 is a metal tube made of metal such as a copper metal and steel. The bourdon tube 4 has the opened rear end and the closed leading end. Further, as illustrated in FIG. 2, the bourdon tube 4 has a flat shape which is crushed in a predetermined direction. For example, the bourdon tube 4 is formed so as to have a sectional shape like a flat athletic track formed of two parallel straight portions and two semicircular portions. Further, the bourdon tube 4 according to this embodiment is formed so as to have a substantially C-shaped front shape. Note that the bourdon tube 4 may be formed so as to have an elliptical sectional shape. Further, the bourdon tube 4 may be formed so as to have a spiral or helical entire shape.

The pointer 6 turns along a scale on a scale plate (not shown). A pinion 8 is fixed to a turning shaft serving as a turning center of the pointer 6. The displacement enlarging mechanism 5 has a function to enlarge a displacement amount of the leading end of the bourdon tube 4 and transmit the displacement amount to the pointer 6. The displacement enlarging mechanism 5 has an input portion to which the leading end of the bourdon tube 4 is fixed. Further, the displacement enlarging mechanism 5 has an output portion in which a sector gear 9 engaged with the pinion 8 is arranged.

As described above, the rear end of the bourdon tube 4 is fixed to the joint 3. Specifically, the rear end of the bourdon tube 4 is fixed to the joint 3 by bonding. Hereinafter, structure of the joint 3 and fixation structure of the bourdon tube 4 to the joint 3 are described.

Structure of the Joint and Fixation Structure of the Bourdon Tube

Figure 3A:
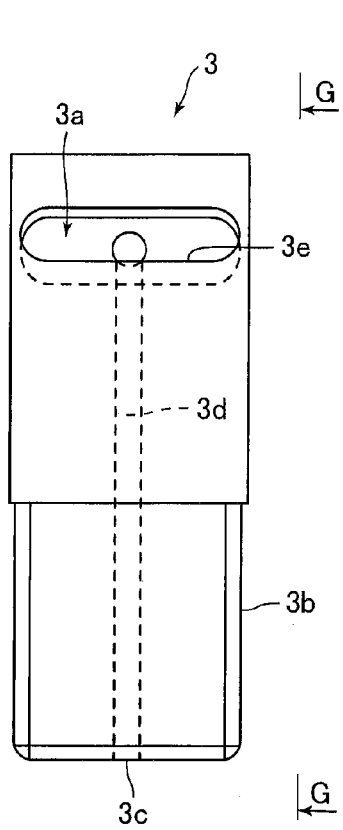
FIG. 3A is a diagram illustrating the joint from an F-F direction of FIG. 1.
Figure 3B:
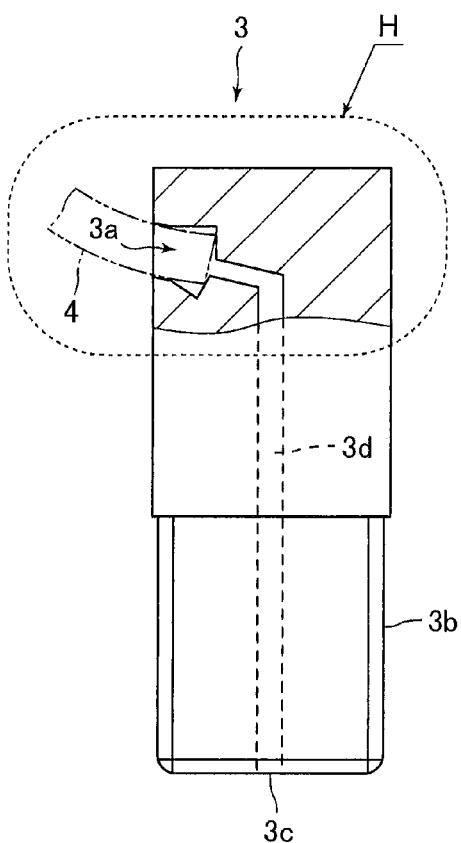
FIG. 3B is a diagram illustrating the joint from a G-G direction of FIG. 3A.
Figure 3C:
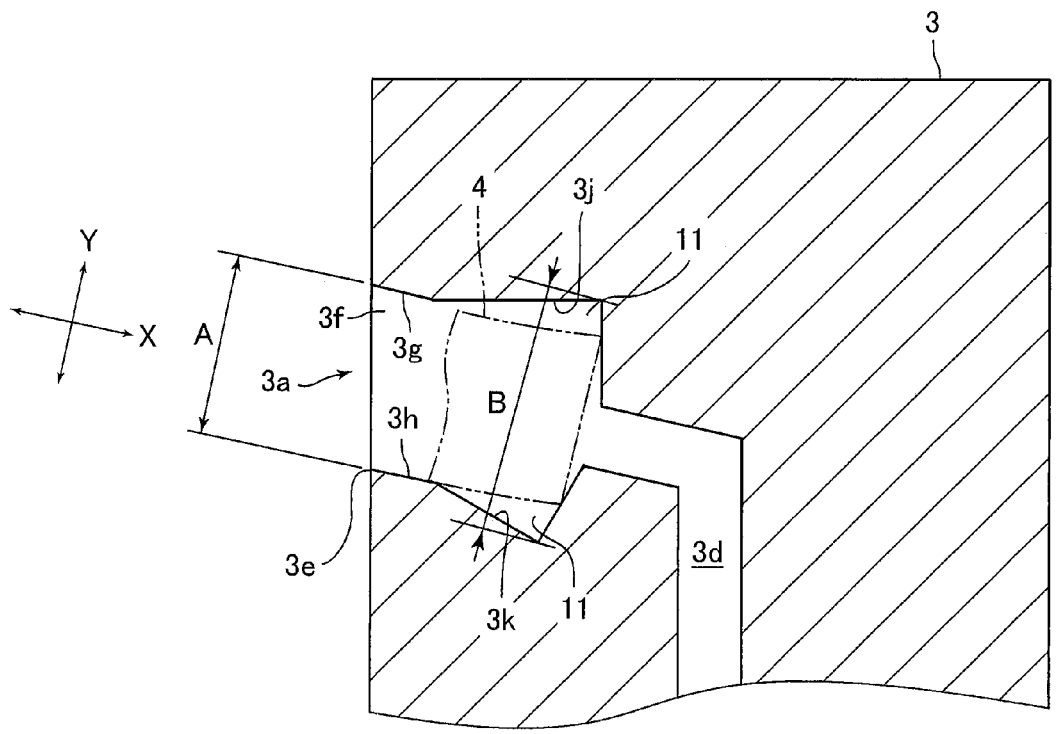
FIG. 3C is an enlarged view of a portion H of FIG. 3B.

FIG. 3 are diagrams illustrating the joint 3 of FIG. 1, of which FIG. 3A is a diagram illustrating the joint 3 from an F-F direction of FIG. 1, FIG. 3B is a diagram illustrating the joint 3 from a G-G direction of FIG. 3A, and FIG. 3C is an enlarged view of a portion H of FIG. 3B.

The joint 3 according to this embodiment is made of a resin. On a side surface on the upper end side of the joint 3, there is formed a fixation hole 3a into which the rear end of the bourdon tube 4 is inserted to be fixed by bonding. Further, on an outer peripheral surface on the lower end side of the joint 3, there is formed a male screw portion 3b for attaching the joint 3 to the pressure container 2. On a bottom surface of the joint 3, there is formed a pressure introduction inlet 3c for introducing a fluid in the pressure container 2 to the bourdon tube 4. Inside the joint 3, there is formed a pressure introduction path 3d though which the fluid introduced from the pressure introduction inlet 3c passes. The pressure introduction path 3d is formed so as to connect the fixation hole 3a with the pressure introduction inlet 3c. The pressure introduction path 3d is formed into a round hole shape.

As illustrated in FIG. 3C, the fixation hole 3a is formed so as to be recessed obliquely downward (in X direction) from one side surface on the upper end side of the joint 3. In this embodiment, the rear end of the bourdon tube 4 is inserted in the X direction from an opening 3e of the fixation hole 3a to the fixation hole 3a. That is, the X direction means an insertion direction of the bourdon tube 4 to the fixation hole 3a. In addition, the opening 3e of the fixation hole 3a is an insertion port for the bourdon tube 4.

Further, in this embodiment, the rear end of the bourdon tube 4 is formed so as to be crushed in a Y direction orthogonal to a vertical direction of FIG. 3C and the insertion direction X thereof. That is, the rear end of the bourdon tube 4 is flattened in the Y direction, and hence the Y direction is a flat direction of the rear end of the bourdon tube 4.

A shape of the opening 3e when seen from the insertion direction X is similar to a sectional outer shape of the bourdon tube 4. Specifically, the shape of the opening 3e when seen from the insertion direction X is a flat shape (in other words, flat athletic-track-like shape) which is slightly larger than the sectional outer shape of the bourdon tube 4.

In a deep side of the opening 3e, there is formed a bourdon tube introduction portion 3f for introducing the bourdon tube 4 to a deep side of the fixation hole 3a so as to be linked to the opening 3e. A shape of the bourdon tube introduction portion 3f when seen from the insertion direction X is as substantially same as the shape of the opening 3e when seen form the insertion direction X. That is, an upper wall surface 3g and a lower wall surface 3h of the bourdon tube introduction portion 3f are formed into a planar shape substantially parallel to the insertion direction X.

As illustrated in FIG. 3C, the deep side of the bourdon tube introduction portion 3f is more widened outwardly in the flat direction Y than the opening 3e. That is, a width B in the flat direction Y of the deep end side of the fixation hole 3a when seen from the insertion direction X is larger than a width A in the flat direction Y of the opening 3e when seen from the insertion direction X. Specifically, an upper wall surface 3j and a lower wall surface 3k on the deep side of the bourdon tube introduction portion 3f are formed into a planar shape inclined so as to be gradually widened outwardly in the flat direction Y as going to the deeper side of the fixation hole 3a. Note that the deep end surface of the fixation hole 3a is formed of two planar portions sharply inclined to an inner side in the flat direction Y as going to the deeper side of the fixation hole 3a. The pressure introduction path 3d is linked to a center portion of the deep end surface.

As illustrated in FIG. 3C, spaces are formed between the rear end of the bourdon tube 4 inserted into the fixation hole 3a and the upper wall surface 3j, and between the rear end of the bourdon tube 4 and the lower wall surface 3k, respectively. The spaces serve as an adhesive pool portion 11 in which the adhesive for fixing the rear end of the bourdon tube 4 to the fixation hole 3a is pooled.

Main Effect of this Embodiment

As described above, in this embodiment, the inside of the fixation hole 3a is more widened than the opening 3e. That is, the deep side of the bourdon tube introduction portion 3f is formed so as to be gradually widened toward the deep side of the fixation hole 3a, and the adhesive pool portion 11 is formed between the rear end of the bourdon tube 4 and the fixation hole 3a. As a result, even when a pressure is generated inside the bourdon tube 4 and a load in the direction of detaching from the fixation hole 3a is applied to the bourdon tube 4, the adhesive cured in the adhesive pool portion 11 is compressed toward the upper wall surface 3j and the lower wall surface 3k, to thereby become less likely to peel off from the upper wall surface 3j and the lower wall surface 3k. Therefore, even when the load in the direction of detaching from the fixation hole 3a is applied to the bourdon tube 4, the bourdon tube 4 is less likely to be detached from the fixation hole 3a as long as the adhesive does not peel off from the surface of the bourdon tube 4. That is, according to this embodiment, it is possible to prevent the detachment of the bourdon tube 4 made of metal from the joint 3 made of a resin.

Further, in this embodiment, the inside of the fixation hole 3a is widened outwardly in the flat direction Y of the rear end of the bourdon tube 4. Therefore, compared with a case where the inside of the fixation hole 3a is widened in the vertical direction of FIG. 3C orthogonal to the flat direction Y, a volume of the adhesive pool portion 11 can be increased, and hence the larger amount of adhesive can be pooled in the adhesive pool portion 11. As a result, the detachment of the bourdon tube 4 from the joint 3 can be effectively prevented.

In this embodiment, the bourdon tube introduction portion 3f having substantially the same shape when seen from the insertion direction X as the shape of the opening 3e when seen from the insertion direction is formed in the deep side of the opening 3e so as to be linked to the opening 3e. As a result, positioning of the bourdon tube 4 with respect to the fixation hole 3a can be facilitated, compared with the case where the inside of the fixation hole 3a is widened immediately from the opening 3e.

Other Embodiments

Figure 4A:
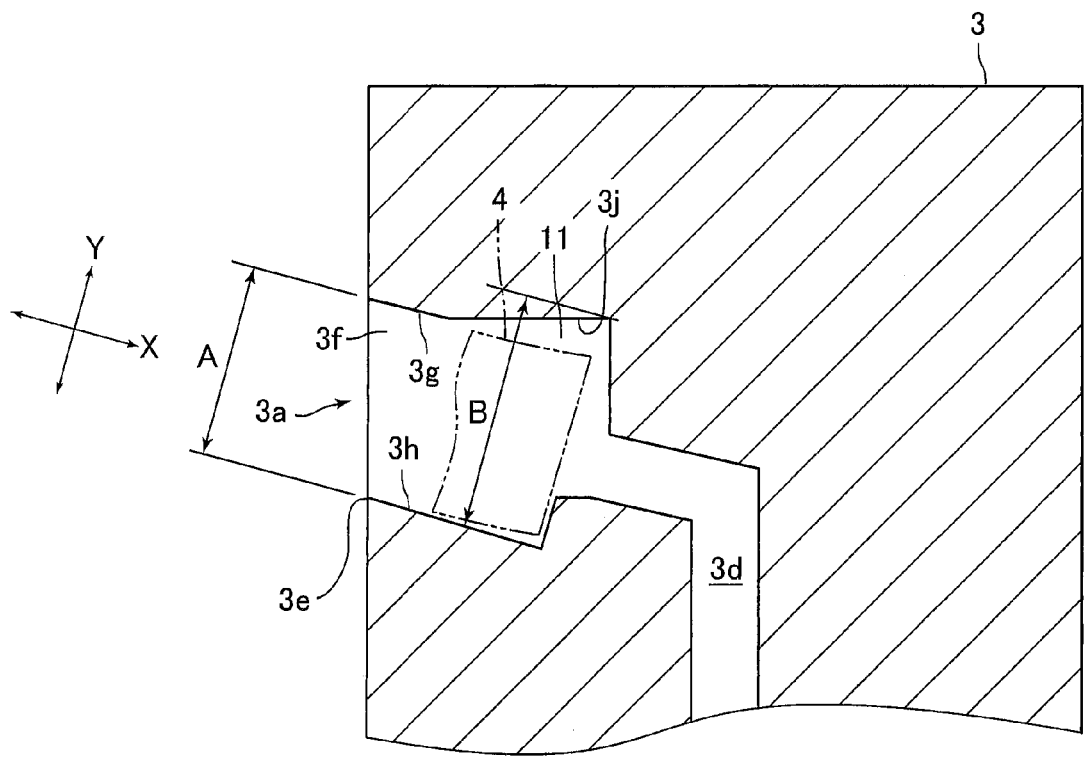
FIG. 4 is a diagram illustrating a structure of a joint according to another embodiment of the present invention.

In the above-mentioned embodiment, the upper wall surface 3j and the lower wall surface 3k on the deep side of the bourdon tube introduction portion 3f are formed into a planar shape inclined so as to be gradually widened outwardly in the flat direction Y as going to the deeper side of the fixation hole 3a. Instead of this structure, as illustrated in FIG. 4A, for example, only the upper wall surface 3j on the deep side of the bourdon tube introduction portion 3f may be formed into a planar shape inclined so as to be gradually widened outwardly in the flat direction Y as going to the deeper side of the fixation hole 3a. Similarly, only the lower wall surface 3k on the deep side of the bourdon tube introduction portion 3f may be formed into a planar shape inclined so as to be gradually widened outwardly in the flat direction Y as going to the deeper side of the fixation hole 3a. In those cases, compared with the case of the above-mentioned embodiment, one of the cutting processes of the fixation hole 3a can be reduced.

Figure 4B:
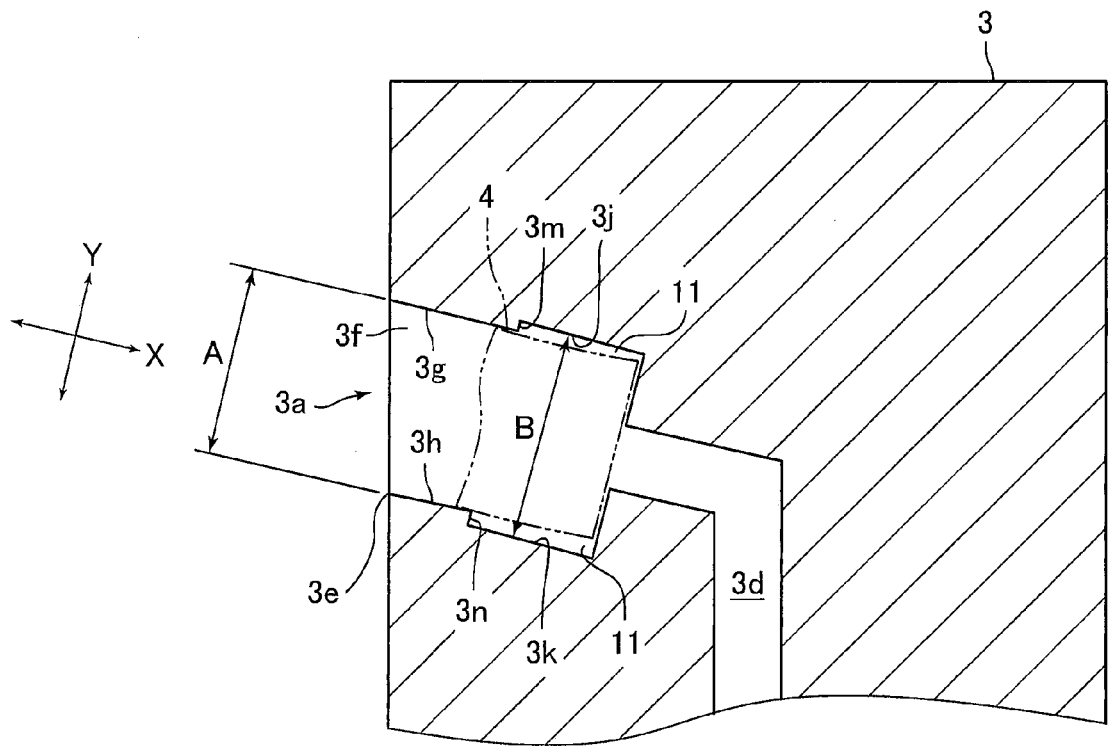

Further, as illustrated in FIG. 4B, the upper wall surface 3j and the lower wall surface 3k on the deep side of the bourdon tube introduction portion 3f may be formed so as to be substantially parallel to the insertion direction X, and the inside of the fixation hole 3a may be formed so as to be more widened than the opening 3e. In this case, when the load in the direction of detaching from the fixation hole 3a is applied to the bourdon tube 4, the adhesive cured in the adhesive pool portion 11 is caught in a step portion 3m formed between the upper wall surfaces 3g and 3j, and in a step portion 3n formed between the lower wall surfaces 3h and 3k. Further, in this case, by using a special cutting tool, one of the cutting processes of the fixation hole 3a can be reduced compared with the case of the above-mentioned embodiment.

Figure 5:
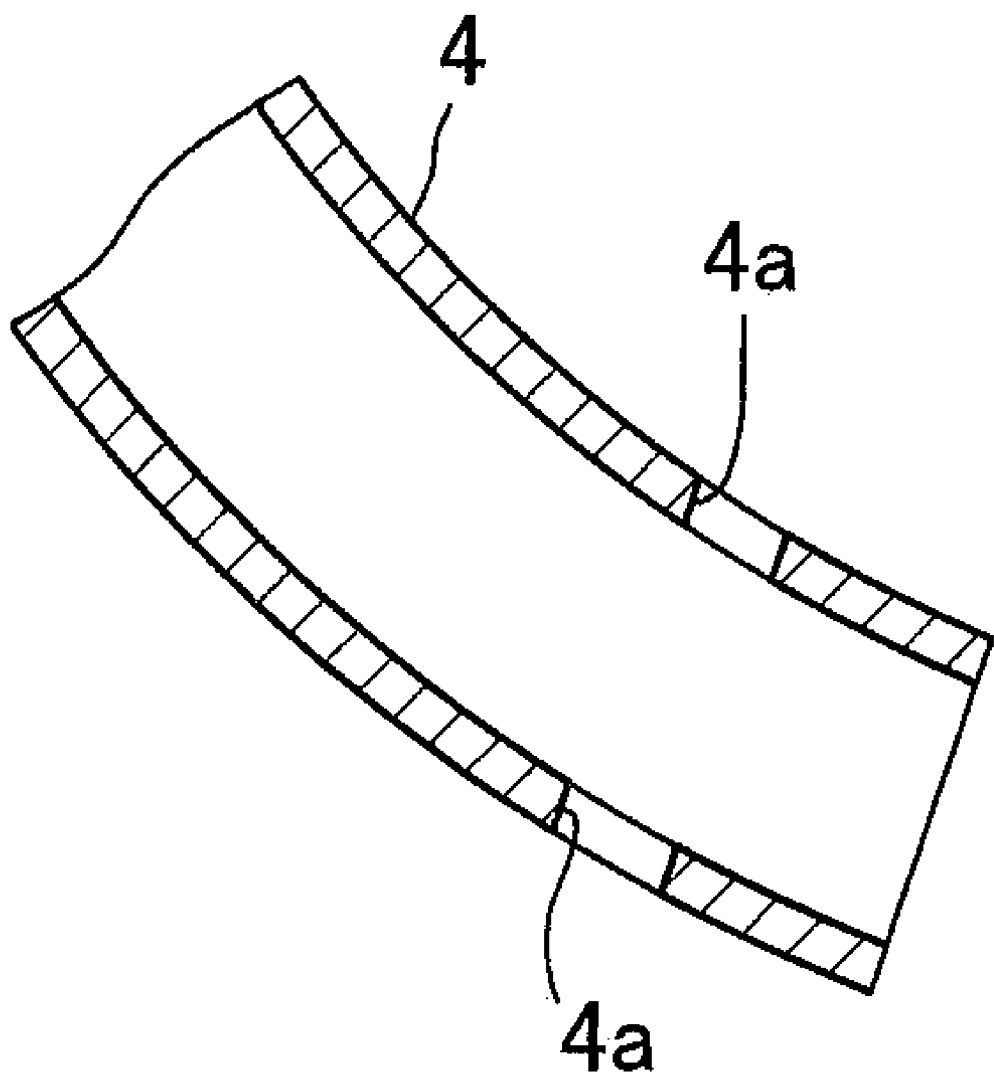
FIG. 5 is a sectional view of a rear end of a bourdon tube according to another embodiment of the present invention.

Further, as illustrated in FIG. 5, a through-hole 4a may be formed in the rear end of the bourdon tube 4. In this case, the adhesive for fixing the rear end of the bourdon tube 4 to the fixation hole 3a penetrates in the through-hole 4a, whereby fixation strength of the bourdon tube 4 with respect to the joint 3 can be increased. As a result, detachment of the bourdon tube 4 from the joint 3 can be effectively prevented.

In the above-mentioned embodiment, the deep side of the bourdon tube introduction portion 3f is widened outwardly in the flat direction Y. Instead of this structure, for example, the deep side of the bourdon tube introduction portion 3f may be widened outwardly in the vertical direction of FIG. 3C (that is, outwardly in the right and left direction of FIG. 3A) orthogonal to the flat direction Y, simultaneously with being widened outwardly in the flat direction Y. Further, the deep side of the bourdon tube introduction portion 3f may be widened outwardly in the vertical direction of FIG. 3C instead of being widened outwardly in the flat direction Y.

In the above-mentioned embodiment, the bourdon tube introduction portion 3f is formed so as to be linked to the opening 3e. However, the inside of the fixation hole 3a may be widened immediately from the opening 3e. Further, in the above-mentioned embodiment, the upper wall surface 3j and the lower wall surface 3k on the deep side of the bourdon tube introduction portion 3f are formed into a planer shape. However, the upper wall surface 3j and the lower wall surface 3k may be formed into a curved shape.

What is claimed is:

1. A bourdon tube pressure gauge comprising:
a joint which is made of a resin and is attached to a pressure container; and
a bourdon tube which is made of metal and has a rear end fixed to the joint,
wherein the joint comprises a fixation hole into which the rear end of the bourdon tube is inserted to be fixed by bonding, and
wherein an inside of the fixation hole is more widened than an opening of the fixation hole which serves as an insertion port for the bourdon tube.

2. A bourdon tube pressure gauge according to claim 1, wherein the inside of the fixation hole is widened in a flat direction of the rear end of the bourdon tube which is inserted into the fixation hole.

3. A bourdon tube pressure gauge according to claim 1, wherein the inside of the fixation hole is formed so as to be gradually widened toward a deep side of the fixation hole.

4. A bourdon tube pressure gauge according to claim 2, wherein the inside of the fixation hole is formed so as to be gradually widened toward a deep side of the fixation hole.

5. A bourdon tube pressure gauge according to claim 1, wherein, in the fixation hole, a bourdon tube introduction portion having substantially the same shape when seen from an insertion direction of the bourdon tube as a shape of the opening when seen from the insertion direction thereof is formed so as to be linked to the opening.

6. A bourdon tube pressure gauge according to claim 2, wherein, in the fixation hole, a bourdon tube introduction portion having substantially the same shape when seen from an insertion direction of the bourdon tube as a shape of the opening when seen from the insertion direction thereof is formed so as to be linked to the opening.

7. A bourdon tube pressure gauge according to claim 3, wherein, in the fixation hole, a bourdon tube introduction portion having substantially the same shape when seen from an insertion direction of the bourdon tube as a shape of the opening when seen from the insertion direction thereof is formed so as to be linked to the opening.

8. A bourdon tube pressure gauge according to claim 4, wherein, in the fixation hole, a bourdon tube introduction portion having substantially the same shape when seen from an insertion direction of the bourdon tube as a shape of the opening when seen from the insertion direction thereof is formed so as to be linked to the opening.

* * * * *